(12) United States Patent
Wright

(10) Patent No.: US 12,296,461 B2
(45) Date of Patent: May 13, 2025

(54) BOX FOLDING STRUCTURE FOR SCARA ROBOT

(71) Applicant: IME Automation LLC, La Verkin, UT (US)

(72) Inventor: Leo Wright, La Verkin, UT (US)

(73) Assignee: IME Automation LLC, La Verkin, UT (US)

( * ) Notice: Subject to any disclaimer, the term of this patent is extended or adjusted under 35 U.S.C. 154(b) by 25 days.

(21) Appl. No.: 18/155,459

(22) Filed: Jan. 17, 2023

(65) Prior Publication Data

US 2023/0226702 A1 Jul. 20, 2023

Related U.S. Application Data

(60) Provisional application No. 63/300,956, filed on Jan. 19, 2022.

(51) Int. Cl.
*B25J 15/00* (2006.01)
*B25J 11/00* (2006.01)
*B31B 50/28* (2017.01)

(52) U.S. Cl.
CPC ......... *B25J 15/0019* (2013.01); *B25J 11/005* (2013.01); *B31B 50/28* (2017.08)

(58) Field of Classification Search
CPC ......... B31B 50/28; B31B 50/48; B31B 50/50; B31B 50/732; B25J 15/0019; B25J 11/005
USPC ....... 493/468, 467, 473, 476, 356, 353, 260, 493/261, 263, 157
See application file for complete search history.

(56) References Cited

U.S. PATENT DOCUMENTS

| | | | | |
|---|---|---|---|---|
| 3,400,640 | A * | 9/1968 | Randles | B65D 5/302 493/137 |
| 3,716,962 | A * | 2/1973 | Langen | B65B 7/20 53/209 |
| 5,106,359 | A * | 4/1992 | Lott | B31B 50/262 493/182 |
| 5,549,537 | A * | 8/1996 | Focke | B31B 50/00 493/162 |
| 6,226,965 | B1 * | 5/2001 | Lam | B65B 51/02 493/333 |
| 6,588,175 | B1 * | 7/2003 | Gaudenzi | B65B 49/08 53/376.4 |
| 6,622,461 | B2 * | 9/2003 | Gambetti | B65B 51/023 493/131 |

(Continued)

*Primary Examiner* — Sameh Tawfik
(74) *Attorney, Agent, or Firm* — Kilpatrick Townsend & Stockton LLP

(57) ABSTRACT

A box folding structure for folding a box is disclosed. The box folding structure includes a curved folding member and an erect folding member. The curved folding member can include a curved surface, a retaining surface, and a first inclined folding surface. The curved surface can be used to fold dust flaps of a box. The retaining surface can be adjacent to the curved surface and can be used for folding a first outer flap of the box. The first inclined folding surface can be defined on a portion of the curved folding member that is adjacent to the curved surface and can be used for folding a second outer flap of the box. The erect folding member can be laterally offset from the curved folding member and can include a second inclined folding surface opposite the first inclined folding surface for folding a second outer flap of the box.

12 Claims, 10 Drawing Sheets

(56) References Cited

U.S. PATENT DOCUMENTS

| | | | | |
|---|---|---|---|---|
| 6,916,280 | B2* | 7/2005 | Tonnigs | B65B 5/028 493/356 |
| 7,470,226 | B1* | 12/2008 | Herrin | B65D 5/0045 493/143 |
| 7,819,791 | B1* | 10/2010 | Ross | B31B 50/52 493/309 |
| 8,246,527 | B2* | 8/2012 | Wilkinson | B31B 50/262 493/70 |
| 9,067,696 | B2* | 6/2015 | Drut | B29C 66/849 |
| 11,911,993 | B2* | 2/2024 | Wright | B31B 50/78 |
| 2005/0091944 | A1* | 5/2005 | Goodman | B65B 7/20 53/376.4 |
| 2006/0205579 | A1* | 9/2006 | Boix Jaen | B31B 50/46 493/143 |
| 2008/0120948 | A1* | 5/2008 | Martin | B65B 49/14 53/491 |
| 2021/0237914 | A1* | 8/2021 | Jonker | B65B 7/28 |

* cited by examiner

BOX FOLDING STRUCTURE FOR SCARA ROBOT

CROSS-REFERENCES TO RELATED APPLICATIONS

This application claims the benefit of U.S. Provisional Application No. 63/300,956, filed Jan. 19, 2022, titled "BOX FOLDING STRUCTURE FOR SCARA ROBOT," the entire contents of which are hereby incorporated in their entirety for all purposes.

TECHNICAL FIELD

The present disclosure relates generally to tools for robotic operations, and more particularly (although not necessarily exclusively), to a box folding structure for a robotic manipulator.

BACKGROUND

Various items, such as consumer products, are packaged in boxes that can range from very small to very large. In some cases, items are produced or otherwise distributed with large volume. Accordingly, the packaging used to present or transport the items may also be produced or distributed with large volume. The packaging is commonly mass-produced in an unfolded configuration that cannot be used to present or transport the items. Thus, each individual package may need to be folded or otherwise prepared for the item prior to use. Folding each individual package can be difficult, time-consuming, and otherwise technically challenging.

SUMMARY

According to certain embodiments of the present disclosure, a box folding structure is provided for folding a box with a SCARA robot. The box folding structure includes a curved folding member and an erect folding member. The curved folding member can include a curved surface, a retaining surface, and a first inclined folding surface. The curved surface can be defined on a first portion of the curved folding member and can be configured for folding a first dust flap of a box and a second dust flap of the box during a first folding operation. The retaining surface may be defined on a second portion of the curved folding member and adjacent to the curved surface. Additionally, the retaining surface may be configured for retaining the first dust flap and the second dust flap in a folded configuration during movement of the box between a first folding operation and a second folding operation. The first inclined folding surface can be defined on a third portion of the curved folding member that is adjacent to the curved surface. The first inclined folding surface can extend from the retaining surface and can be configured for folding a first outer flap of the box during a third folding operation. The erect folding member can be laterally offset from the curved folding member. Additionally, the erect folding member can include a second inclined folding surface defined on a fourth portion of the erect folding member opposite the first inclined folding surface. The second inclined folding surface can be configured for folding a second outer flap of the box during the second folding operation.

In some embodiments, the erect folding member and the curved folding member can be mechanically coupled to a support frame via a plurality of mounting feet, and (i) the erect folding member can be mechanically coupled to the curved folding member via the plurality of mounting feet or (ii) the erect folding member can be mechanically coupled to the support frame via a first mounting foot of the plurality of mounting feet and separately from and adjacent to the curved folding member that is mounted to the support frame via a second mounting foot of the plurality of mounting feet. In certain embodiments, the first inclined folding surface and the second inclined folding surface can be laterally spaced apart and define a slot configured to receive the second outer flap during the first folding operation and the second folding operation. In some embodiments, the first inclined folding surface can be adjacent to a first rigid surface, the second inclined folding surface can be adjacent to a second rigid surface, and the first rigid surface and the second rigid surface can be coplanar with respect to one another.

In some embodiments, the retaining surface can include a chamfered edge that is configured to facilitate rotation of the box during the second folding operation. In certain embodiments, the curved surface can include a first curve, a second curve adjacent to the first curve, and a third curve adjacent to the second curve. The first curve can include a first radius-of-curvature that is configured to facilitate folding the first dust flap during a first portion of the first folding operation, the second curve can include a second radius-of-curvature that is configured to facilitate folding the second dust flap during a second portion of the first folding operation, and the third curve can include a third radius-of-curvature that is configured to retain the first dust flap and the second dust flap in a folded configuration. In some embodiments, the first radius-of-curvature, the second radius-of-curvature, and the third radius-of-curvature can be values that vary across an arc of the first curve, the second curve, and the third curve, respectively, and the third curve can curve in an opposite direction compared to the first curve and the second curve.

In some embodiments, at a first end of the first curve, the first radius-of-curvature can be zero, at a second end of the first curve opposite the first end, the first radius-of-curvature can have a maximum value. At a first end of the second curve, the second radius-of-curvature can have the maximum value, and the first end of the second curve can be the same as the second end of the first curve. At a second end of the second curve opposite the first end, the second radius-of-curvature can be zero and the second curve is connected to the retaining surface via the third curve. In certain embodiments, a top end of a flat surface adjacent to the first curve can extend vertically above the second end of the second curve. In some embodiments, the erect folding member can additionally include a chamfered notch adjacent to the second inclined folding surface, and the chamfered notch can be configured to begin folding the second dust flap during the second folding operation.

According to certain embodiments of the present disclosure, a method is provided for folding a box. A first dust flap of a box and a second dust flap of the box can be folded using a curved surface of a curved folding member of a box folding structure. A first outer flap of the box can be folded using a first inclined folding surface of an erect folding member of the box folding structure while a retaining surface of the curved folding member retains the first dust flap and the second dust flap in a folded configuration. A second outer flap of the box can be folded using a second inclined folding surface of the curved folding member while retaining the first outer flap against the retaining surface of the curved folding member.

In some embodiments, folding the first outer flap can involve receiving the second outer flap in a slot defined by the first inclined folding surface being laterally spaced apart from the second inclined folding surface. In certain embodiments, folding the first outer flap can involve rotating the box around a chamfered edge of the retaining surface. In some embodiments, folding the first dust flap of the box and the second dust flap of the box may involve (i) folding the first dust flap during a first operation by pushing the box against a first curve of the curved surface that has a first radius-of-curvature, and (ii) folding the second dust flap during a second operation by pushing the box against a second curve of the curved surface that has a second radius-of-curvature. Additionally, the first radius-of-curvature and the second radius-of-curvature may each have values that vary across an arc of the first curve and the second curve, respectively. In certain embodiments, folding the first outer flap of the box can involve partially folding the first out flap of the box by pushing the first outer flap against a chamfered notch adjacent to the second inclined folding surface.

According to certain embodiments of the present disclosure, a box folding system is provided for folding a box with a SCARA robot. The box folding system includes a support frame, a box folding structure, and a robotic manipulator. The box folding structure can be fixedly mounted to the support frame and configured for folding a box. The box folding structure can include a curved folding member and an erect folding member. The curved folding member can include a curved surface, a retaining surface, and a first inclined folding surface. The curved surface can be defined on a first portion of the curved folding member, and the curved surface can be configured for folding a first dust flap of a box and a second dust flap of the box during a first folding operation. The retaining surface can be defined on a second portion of the curved folding member and adjacent to the curved surface, and the retaining surface can be configured for retaining the first dust flap and the second dust flap in a folded configuration during movement of the box between a first folding operation and a second folding operation. The first inclined folding surface can be defined on a third portion of the curved folding member that is adjacent to the curved surface, and the first inclined folding surface can extend from the retaining surface and can be configured for folding a first outer flap of the box during a third folding operation. The erect folding member can be laterally offset from the curved folding member, and the erect folding member can include a second inclined folding surface defined on a fourth portion of the erect folding member opposite the first inclined folding surface. Additionally, the second inclined folding surface can be configured for folding a second outer flap of the box during the second folding operation. The robotic manipulator can be fixedly mounted to the support frame and can include an end effector. The robotic manipulator can be configured for manipulating the box with respect to the box folding structure using the end effector to fold the box.

In some embodiments, the first inclined folding surface and the second inclined folding surface can be laterally spaced apart and can define a slot configured to receive the second outer flap during the first folding operation and the second folding operation. In certain embodiments, the retaining surface can include a chamfered edge that is configured to facilitate rotation of the box during the second folding operation. In some embodiments, the curved surface can include a first curve, a second curve adjacent to the first curve, and a third curve adjacent to the second curve, and the first curve can include a first radius-of-curvature that is configured to facilitate folding the first dust flap during a first portion of the first folding operation. The second curve can include a second radius-of-curvature that is configured to facilitate folding the second dust flap during a second portion of the first folding operation, and the third curve can include a third radius-of-curvature that is configured to retain the first dust flap and the second dust flap in a folded configuration. In some embodiments, the first radius-of-curvature, the second radius-of-curvature, and the third radius-of-curvature can be values that vary across an arc of the first curve, the second curve, and the third curve, respectively, and the third curve can curve in an opposite direction compared to the first curve and the second curve.

BRIEF DESCRIPTION OF DRAWINGS

The present disclosure is described in conjunction with the appended figures.

DETAILED DESCRIPTION

Figure 1:
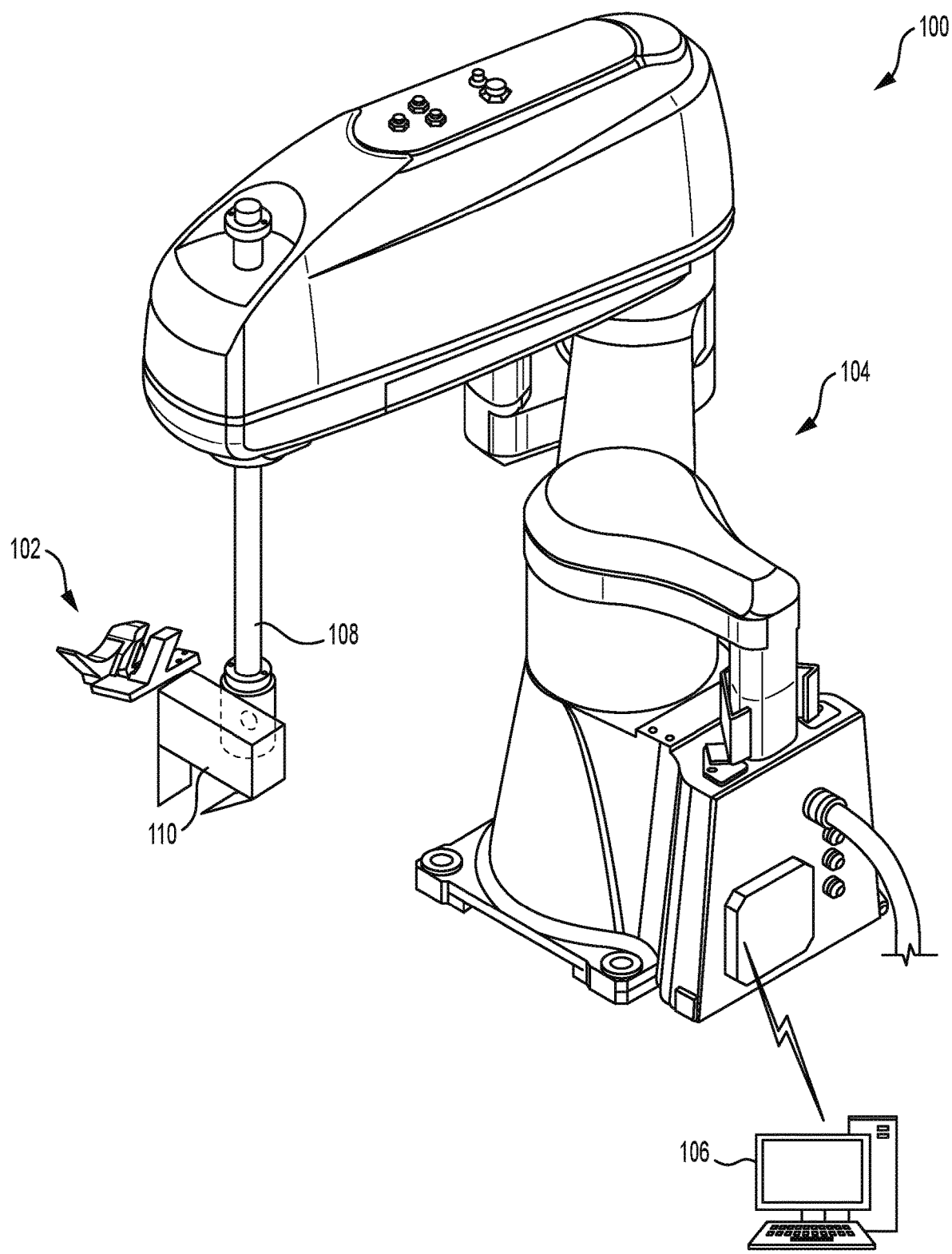
FIG. 1 is an example of a box erecting system, according to some examples of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Certain aspects and features of the present disclosure are described with respect to a box folding structure for folding a box using a Selective Compliance Assembly Robot Arm (SCARA) type robotic manipulator (referred to herein as a "SCARA robot" or "SCARA robotic manipulator"). The box folding structure can be included in a box folding system that includes a robot, such as a SCARA robot, a multi-axis (e.g., 4-axis, 5-axis, 6-axis, and the like) robotic manipulator, or other suitable robotic manipulator, a computing device, the box folding structure, and any other components or features for folding the box such as those described herein. The box can include any suitable package for presenting, transporting, storing, or otherwise containing an item such as a consumer product or other items. The robot can manipulate the box against the box folding structure or any component thereof to fold the box.

Examples are described herein in the context of a box folding structure for folding boxes using a SCARA robot. Throughput improvements and efficiency gains may be achieved using the box folding structure in connection with a SCARA robot. Though, while the box folding structure may be particularly configured for use with a SCARA, similar throughput improvements and efficiency gains may also be realized when other types of robotic manipulators are used. Thus, those of ordinary skill in the art will realize that the following description, including discussions of use with a SCARA robot, is illustrative only and is not intended in any way to be limiting. For example, the features described with respect to box folding structure are applicable for use with other robotic manipulators and to folding other containers that include rigid or semi-rigid parts. These features are also applicable to the assembly of boxes having different form factors than those expressly described herein. Reference will now be made in detail to implementations of examples as illustrated in the accompanying drawings. The same reference indicators will be used throughout the drawings and the following description to refer to the same or like items. While measurements of some of the structures are given, it should be understood that these are examples and structures having other dimensions representing different portions are covered by this description.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Manual assembly of boxes may be time-consuming and may delay upstream processes and downstream processes. This may partially be due to the design of the boxes, as described further with respect to FIG. 2. For example, closing one end of an exemplary box may require closing, and possibly retaining closed, two or more dust-covering components (e.g., dust flaps) and then closing two different outer flaps of the box in two separate operations while retaining the dust-covering components closed.

The box folding structure described herein may enable an automated operator, such as a robotic manipulator, to assemble such boxes, or any other similar boxes, more efficiently, with less error, and at a rate that far outpaces what a human or multiple humans could achieve. Generally, the box folding structure is a structure or set of structures that can be rigidly attached to a surface, such as a platform, tabletop, or the like, and that includes a combination of features, such as notches and curved surfaces, that can be pushed-against by a robotic manipulator to automatically assemble a box.

In a particular example, a box erecting system may include a robotic manipulator, a support frame, a box folding structure, and other suitable components for folding the box using the box folding structure. The robotic manipulator and/or the box folding structure can be fixedly mounted on the support frame, any suitable component thereof, such as a support surface of the support frame, or the like. For example, the box folding structure can be positioned on the support frame such that the robotic manipulator can fold or otherwise assemble the box using the box folding structure. For example, the robotic manipulator can use a first portion of the box folding structure to fold a pair of dust flaps of the box. Additionally, the robotic manipulator can rotate the box around a central axis to position an outer flap in a middle portion of the box folding structure while retaining the pair of dust flaps in a folded configuration. The robotic manipulator can fold a first outer flap using a second portion of the box folding structure, and, while retaining the first outer flap in a folded configuration, the robotic manipulator can fold a second outer flap of the box using a third portion of the box folding structure. In some examples, the support frame can receive the box folding structure such that the box folding structure is adjacent to or otherwise proximate to the robotic manipulator and, in some cases, a box retaining device that can retain boxes that the robotic manipulator can fold using the box folding structure.

When the box folding structure is positioned on or otherwise suitably with respect to the box erecting system, the box retaining device and the box erecting device can be positioned proximate to the robotic manipulator. For example, when the box folding structure is positioned suitably with respect to the box erecting system, the robotic manipulator can pick up or otherwise manipulate boxes originating in the box retaining device and can assemble the boxes using the box folding structure. In some examples, the robotic manipulator, or other suitable entity, can use a curved folding member and/or an erect folding member of the box folding structure to assemble the box. For example, the robotic manipulator can fold dust flaps of the box using the curved folding member and, while retaining the dust flaps at least partially in the box, the robotic manipulator can fold the outer flaps of the box using the erect folding member of the box folding structure.

Turning now to the Figures, FIG. 1 is an example of a box erecting system 100, according to some examples of the present disclosure. The box erecting system 100 includes a box folding structure 102, a robotic manipulator 104, and a computer system 106. The robotic manipulator 104 can include an end effector 108 that can manipulate a box 110 intended to be folded. For example, the box erecting system 100 is illustrated with the end effector 108 of the robotic manipulator 104 retaining the box 110 in a partially assembled state. As described in more detail in later figures, the robotic manipulator 104 may manipulate the box 110 against the box folding structure 102 for causing the box 110 to be folded. For example, the robotic manipulator 104 may cause various flaps of the box 110 to contact various portions of the box folding structure 102 to cause the various flaps to fold, which allows the box 110 to be transformed into a folded configuration. In some examples, the computer system 106 may be a robotic controller or other suitable control electronics for controlling the robotic manipulator.

The robotic manipulator 104 may be any suitable manipulator including an end effector and having any suitable number (e.g., three, four, five, six, etc.) of degrees of freedom. As illustrated, the robotic manipulator 104 is an example of a Selective Compliance Assembly Robot Arm (SCARA), but other manipulators, such as articulated robots, Cartesian coordinate robots, cylindrical coordinate robots, spherical coordinate robots, and any other suitable robot (including collaborative robots), may be used. The computer system 106 may be configured to control the operation of the robotic manipulator 104 and other aspects of an automated facility in which the box erecting system 100 is implemented. In some examples, the box erecting system 100 may be particularly configured for erecting boxes using a four-dimensional robot such as a SCARA.

Figure 2:
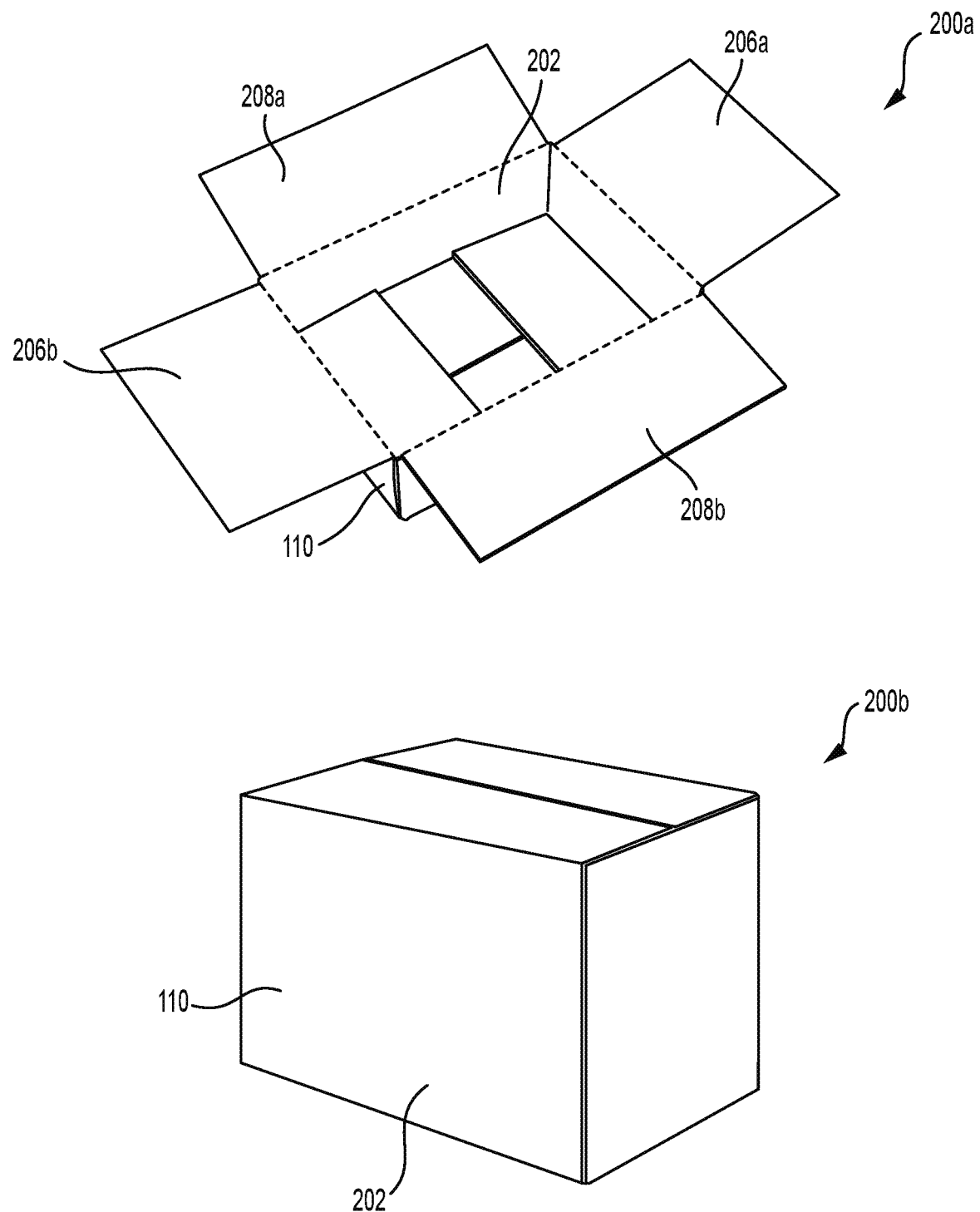
FIG. 2 is an example of a box that can be folded by the box erecting system of FIG. 1 according to some examples of the present disclosure.

FIG. 2 is an example of a box that can be folded by the box erecting system of FIG. 1 according to some examples of the present disclosure. For example, the box 110 can be folded from an unfolded or partially unfolded configuration 200a or otherwise erected by the box folding structure 102 into a folded configuration 200b. As illustrated in FIG. 2, the box 110 is in a partially assembled state. In particular, a main compartment 202 is illustrated as being assembled. The main compartment 202 may include four sides that, in combination, define a rectangular volume, though other suitably shaped volumes (e.g., cylindrical, cubic, irregular shapes, etc.) are possible.

As illustrated in FIG. 2, the box 110 also includes dust flaps 206a-206b and outer flaps 208a-208b. The dust flaps 206a-206b may be configured to fold inward, such as towards each other, along the dashed lines dividing the dust flaps from the main compartment 202, or in other suitable directions. The outer flaps 208a-208b may be configured to fold inward, such as towards each other, along the dashed lines dividing the outer flaps 208a-208b from the main compartment 202, or in other suitable directions. Additionally, the outer flaps 208a-208b may be configured to be folded on top of the dust flaps 206a-206b subsequently to the dust flaps 206a-206b being folded. The dust flaps 206a-206b and/or the outer flaps 208a-208b may represent a generally rectangular shape, though other suitable shapes, such as a triangle, a pentagon, irregular shapes, and the like, can be represented by the dust flaps 206a-206b and/or the outer flaps 208a-208b.

The box 110 can be folded or otherwise erected by the box erecting system 100. For example, the robotic manipulator 104 can manipulate the box 110 such that the dust flaps 206a-206b (e.g., individually or in combination) are folded and then the outer flaps 208a-208b (e.g., individually or in combination) are folded on top of the folded dust flaps 206a-206b. In some embodiments, the robotic manipulator 104 pushes the dust flaps 206a-206b, the outer flaps 208a-208b, any suitable component thereof, or any other suitable components of the box 110 against suitable portions of the box folding structure 102 to cause the box 110 to be folded.

Figure 3:
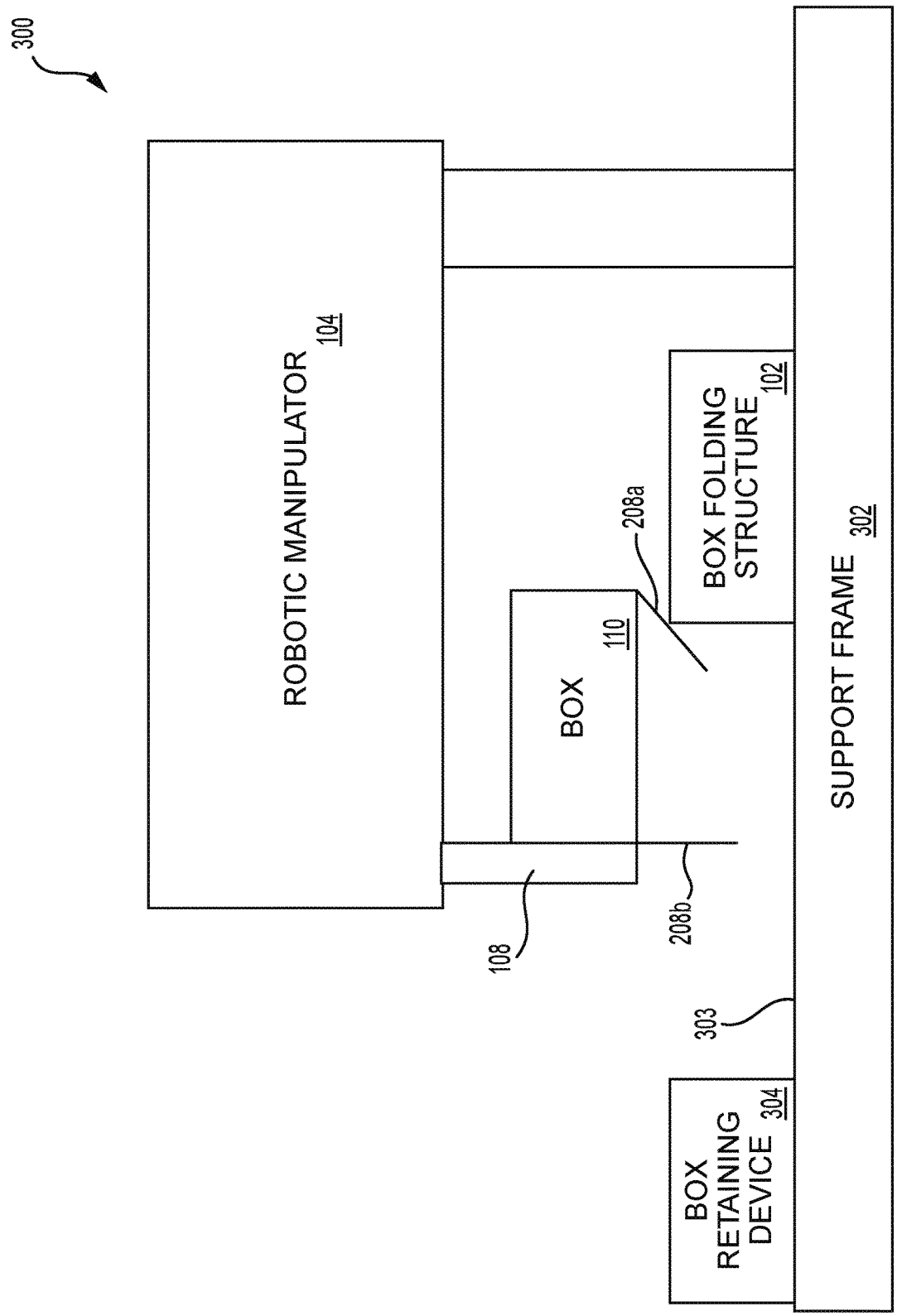
FIG. 3 is a block diagram of the box erecting system according to some examples of the present disclosure.

FIG. 3 is a block diagram of the box erecting system 100 according to some examples of the present disclosure. As illustrated, the box erecting system 100 includes a support frame 302 that can support components of the box erecting system 100, but the box erecting system 100 can include or be positioned on any other suitable, rigid surface that allows the box 110 to be folded by the box erecting system 100. The support frame 302 can be square-shaped, rectangular-shaped, circular-shaped, irregularly shaped, or any other suitable shape for retaining the box erecting system 100 or any component thereof. In some embodiments, the support frame 302 includes an exterior shell (not shown) that encapsulates elements of the box erecting system 100 for increased safety. In some embodiments, a support surface 303 is secured to or otherwise supported by the support frame 302. The support surface 303 may generally be planar and may be formed from a sheet material of rigid composition. The support surface 303 includes various openings for receiving components of the box erecting system 100. In some embodiments, the box retaining device 304 can be positioned on the support surface 303 or on the support frame 302 and can be sized to receive and/or retain one or more boxes to be folded by the box erecting system 100.

As illustrated, the box erecting system 100 includes the robotic manipulator 104, the box folding structure 102, and the box retaining device 304. The robotic manipulator 104 can be fixedly mounted to the support frame 302 and includes the end effector 108, which is illustrated as picking up the box 110 via the main compartment 202 of the box 110. In some examples, the end effector 108 may include a suction block that includes a rectangular block including a lower planar surface and one, two, three, or more suction cups or other suction nozzles disposed along the lower planar surface. In some examples, the lower surface of the suction block may include a material with a high coefficient of friction (e.g., non-abrasive, slip-proof grip tape such as CatTongue® Grips). For example, the robotic manipulator 104 can position the end effector 108 to abut a surface of the box 110, and the robotic manipulator 104, or the computer system 106, can cause a vacuum to form in the end effector 108 that causes the box 110 to temporarily adhere to the end effector 108. While adhered to the end effector 108, the box 110 can be folded by the box erecting system 100, for example by the robotic manipulator 104 pushing various portions of the box 110 against various portions of the box folding structure 102 in a certain order.

The box retaining device 304 can receive the box 110, or other suitable packaging material to be folded, in an unfolded configuration. The box 110 in the unfolded configuration can be retained in the box retaining device 304 until the robotic manipulator 104 is caused to position the end effector 108 over the box 110 to pick up the box 110 to fold the box 110 using the box folding structure 102.

The box folding structure 102 can include various structures and/or components for allowing the robotic manipulator 104 to fold the box 110. For example, and as illustrated in more detail in later figures, the box folding structure 102 includes a curved folding member and an erect folding member. The box folding structure 102 can include any other suitable structures or components for allowing the robotic manipulator 104 or other suitable component of the box erecting system 100 to fold the box 110. In some embodiments, more than one box folding structure 102 can be included in the box erecting system 100. For example, a first component of a first box folding structure can be positioned adjacent to a corresponding component of a second box folding structure such that the first box folding structure and the second box folding structure are mirrored copies.

Figure 4:
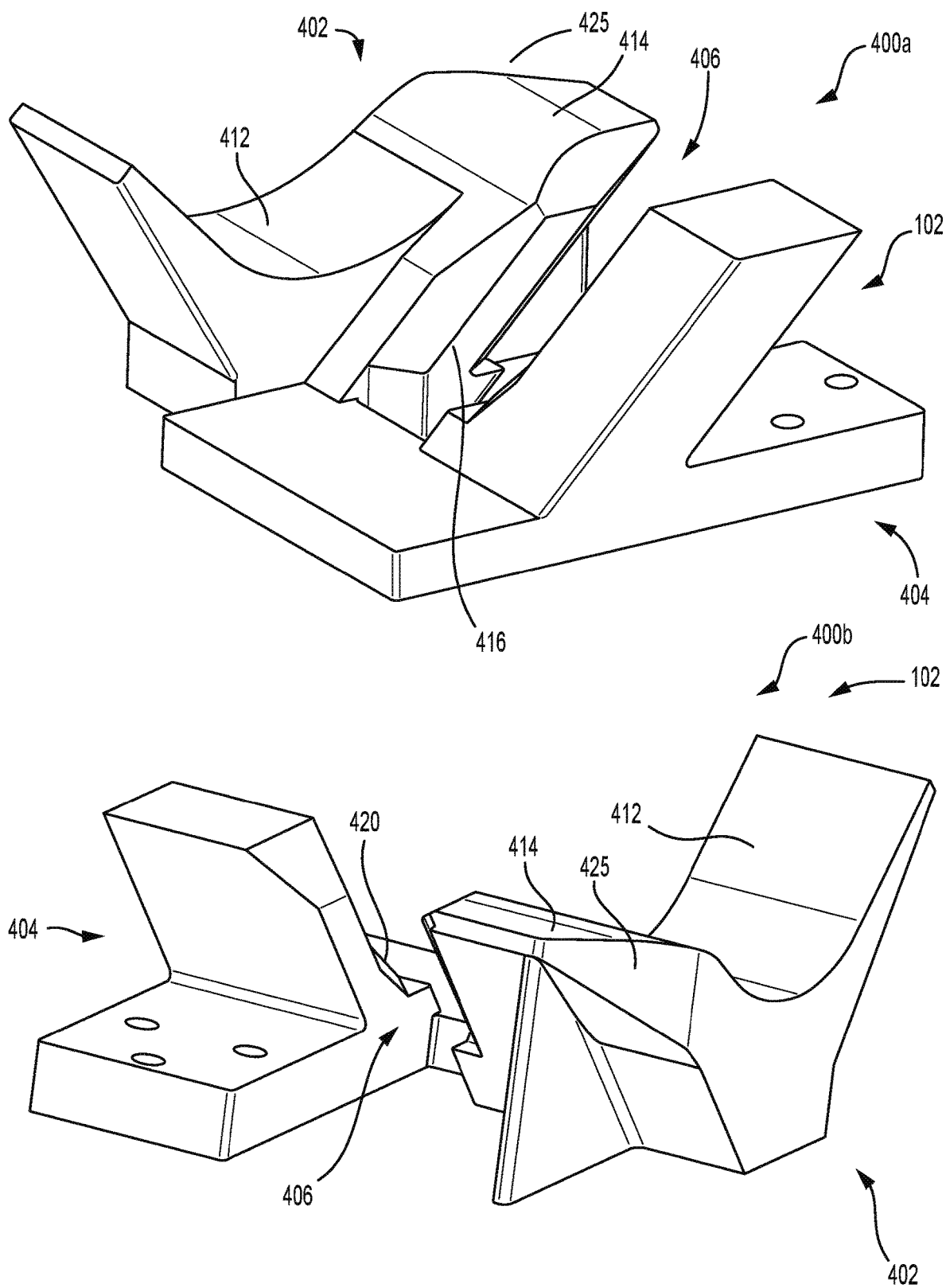
FIG. 4 is a set of perspective views of a box folding structure according to some examples of the present disclosure.
Figure 5:
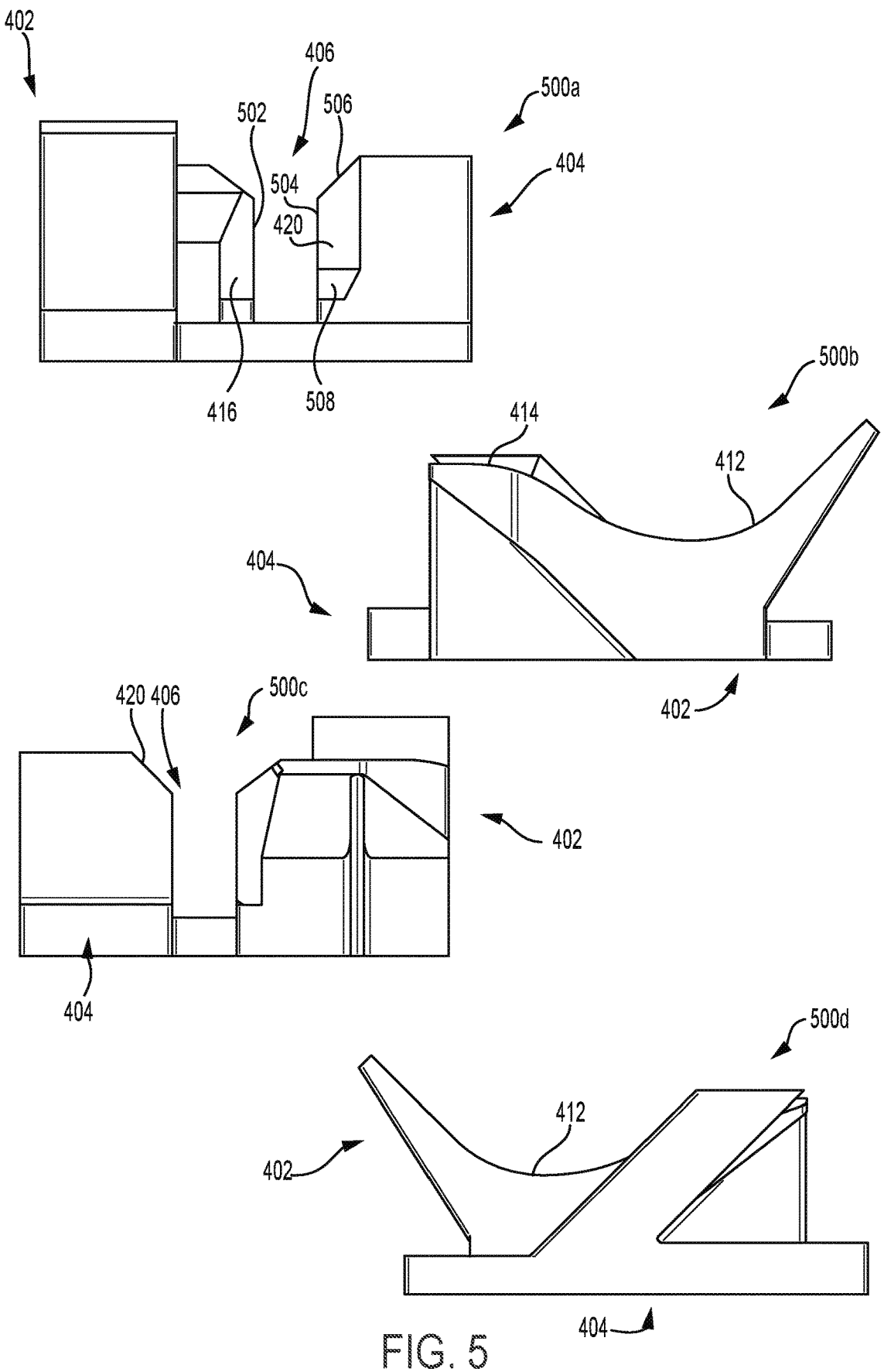
FIG. 5 is a set of isometric views of the box folding structure according to some examples of the present disclosure.

FIG. 4 is a set of perspective views 400a-b of a box folding structure 102 according to some examples of the present disclosure, and FIG. 5 is a set of isometric views 500a-d of the box folding structure 102 according to some examples of the present disclosure. As illustrated, the box folding structure 102 includes a curved folding member 402 and an erect folding member 404. In some examples, the curved folding member 402 is mechanically coupled to the erect folding member 404 and/or vice versa. In other examples, the curved folding member 402 may be mechanically separate from the erect folding member 404. The box folding structure 102 can include any other suitable components for erecting the box 110.

The curved folding member 402 may be laterally offset from the erect folding member 404. For example, the curved folding member 402 may be positioned with respect to the erect folding member 404 to define a slot 406 between the curved folding member 402 and the erect folding member 404. The slot 406 may be sized to receive one or more of the outer flaps of the box 110. For example, a first outer flap 208a can be positioned in the slot 406 while the robotic manipulator performs a first folding operation to fold the dust flaps 206a-206b. Additionally, and substantially contemporaneously to a second folding operation to fold the first outer flap 208a, a second outer flap 208b can be positioned in the slot 406 to prepare the second outer flap 208b to be folded in a third folding operation.

The curved folding member 402 can include a curved surface 412, a retaining surface 414, and a first inclined folding surface 416. The erect folding member 404 can include a second inclined folding surface 420. The curved surface 412 can be connected or otherwise adjacent to the retaining surface 414, one or both of which may be connected or adjacent to the first inclined folding surface 416. For example, the curved surface 412, the retaining surface 414, and the first inclined folding surface 416, or any sub-combination thereof, may be a unit construction. In other examples, one or more of the curved surface 412, the retaining surface 414, or the first inclined folding surface 416 may be individually manufactured and mechanically connected to, or adhesively connected to, one or more other components of the curved folding member 402. The retaining surface 414 can include a chamfered edge 425 having a chamfered surface that is configured to prevent the second outer flap 208b from folding outward while the box 110 rotates about a central axis and translates across the box folding structure 102 to fold the first outer flap 208a during the second folding operation.

Additionally, the first inclined folding surface 416 can be laterally, or otherwise suitably, spaced apart from the second inclined folding surface 420. For example, the first inclined folding surface 416 can be positioned one mm, 5 mm, one cm, five cm, 10 cm, 20 cm, or more away from the second inclined folding surface 420. In some examples, the first inclined folding surface 416 can be laterally spaced apart a distance approximately equal to a width of one or more dust flaps (e.g., the dust flaps 206a-b) or one or more outer flaps (e.g., the outer flaps 208a-b) of the box 110. Additionally, the first inclined folding surface 416 being spaced apart from the second inclined folding surface 420 may define the slot 406 or a width thereof. The first inclined folding surface 416 can be spaced apart from the second inclined folding surface 420 to define the slot 406 that may be configured to receive the first outer flap 208a and/or the second outer flap 208b during the first folding operation and/or the second folding operation.

The first inclined folding surface 416 may be adjacent to a first rigid surface 502, and the second inclined folding surface 420 may be adjacent to a second rigid surface 504. The first rigid surface may be positioned on the curved folding member 402, and the second rigid surface 504 may be positioned on the erect folding member 404. The first rigid surface 502 may be laterally offset from and substantially parallel to the second rigid surface 504, and an arrangement of the first rigid surface 502 and the second rigid surface 504 may define the slot 406. Additionally, the first inclined folding surface 416 may not be coplanar with respect to the second inclined folding surface 420. The second inclined folding surface 420 may also be adjacent to a first chamfered notch 506 and to a second chamfered notch 508.

Figure 6:
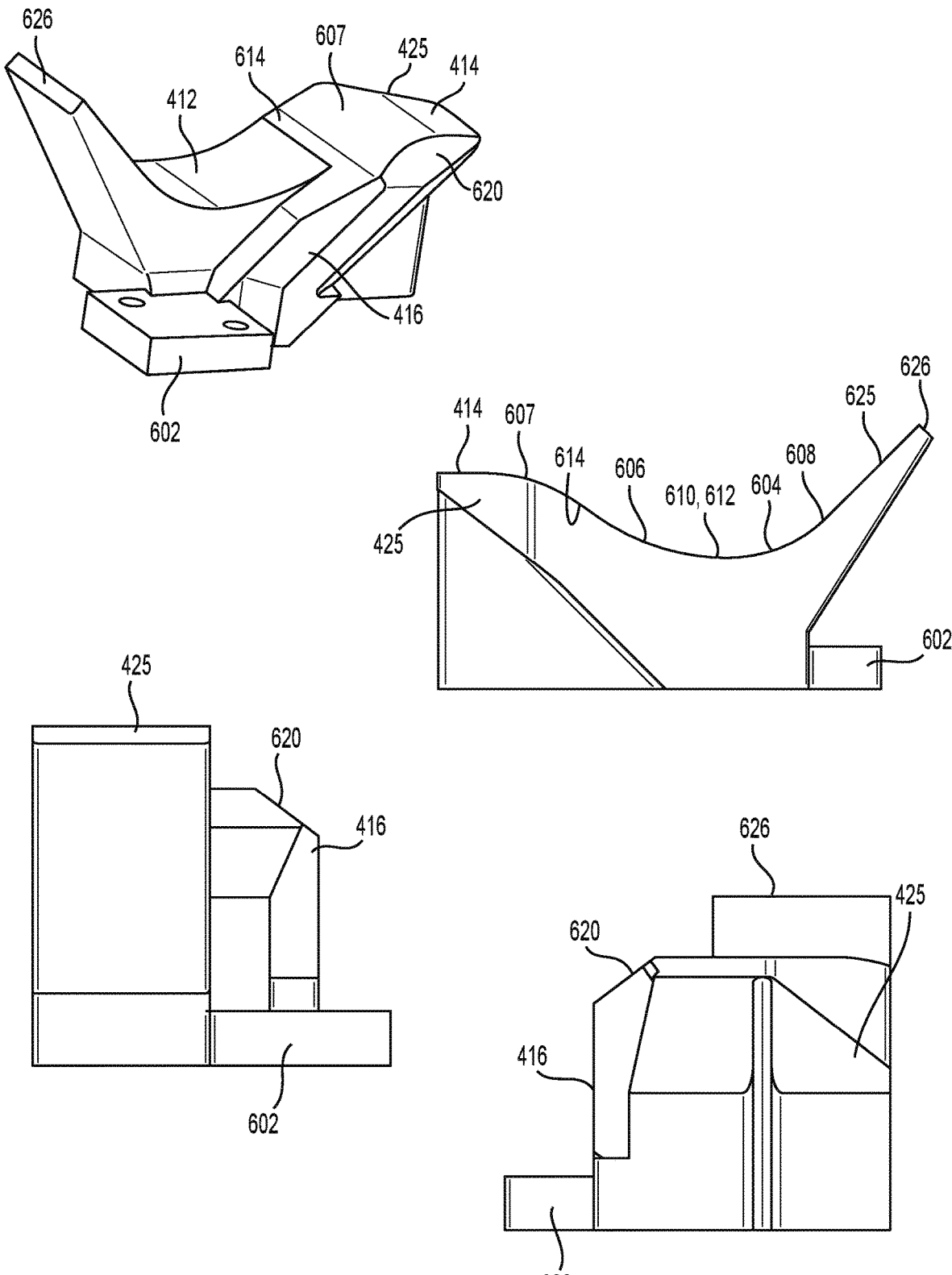
FIG. 6 is a set of views of a curved folding member of the box folding structure according to some examples of the present disclosure.

FIG. 6 is a set of views of a curved folding member 402 of the box folding structure 102 according to some examples of the present disclosure. As illustrated in FIG. 6, the curved folding member 402 includes the curved surface 412, the retaining surface 414, and the first inclined folding surface 416. The curved folding member 402 can include other suitable components for mounting the box folding structure 102 to a mounting surface. For example, the curved folding member 402 may include a first mounting foot 602 or the like. The first mounting foot 602 can be positioned on a bottom portion of the curved folding member 402 and connected to the curved surface 412. Additionally or alternatively, the first mounting foot 602 can be used to attach the curved folding member 402 to the support frame 302, to the erect folding member 404, or to a combination thereof.

The curved surface 412 can include a first curve 604, a second curve 606, a third curve 607, and a flat surface 625, though other suitable number of curves, flat surfaces, or other features for the curved surface 412 are possible. The flat surface 625 may extend from a top end 626 of the curved surface 412 to a first end 608 of the first curve 604. The first curve 604 may extend from the first end 608 to a second end 610, and the second curve 606 can extend from a first end 612 of the second curve 606 to a second end 614 of the second curve 606, which may be an inflection point. The third curve 607 may extend from the second end 614 of the second curve 606 to the retaining surface 414, and the third curve 607 may be oppositely curved compared to the first curve 604 and the second curve 606. In some examples, the second end 610 of the first curve 604 and the first end 612 of the second curve 606 may be similar or identical. Additionally, the first curve 604 may have a first radius-of-curvature, and the second curve 606 may have a second radius-of-curvature. The first radius-of-curvature and/or the second radius-of-curvature may be variable, constant, partially variable and/or constant, or the like. For example, and as illustrated in FIG. 6, the first radius-of-curvature and the second radius-of-curvature have values that vary along the arc of the first curve 604 and the second curve 606. Some examples of the first radius-of-curvature and the second radius-of-curvature can include 1 mm, 10 mm, 30 mm, 75 mm, 100 mm, 300 mm, 600 mm, 1000 mm, or greater. Additionally or alternatively, the first radius-of-curvature can be zero at the first end 608 of the first curve 604 and can have a maximum value at the second end 610 of the first curve 604, and the second radius-of-curvature can have a maximum value at the first end 612 of the second curve 606 and can be zero at the second end 614 of the second curve 606.

In some examples, the first end 608 of the first curve 604 may not extend past the second end 614 of the second curve 606. As illustrated in FIG. 6, the first end 608 does not extend vertically above the second end 614 of the second curve. The flat surface 625 extending past the second end 614 to the top end 626 may allow the first end 608 and the flat surface 625 of the curve surface 412 to quickly fold and retain a first dust flap 206a of the box 110 during a first folding operation for folding the box 110. Additionally, the second end 614 of the second curve 606 can be connected to the retaining surface 414 via the third curve 607.

In some examples, the first inclined folding surface 416 can extend along a length of the curved folding member. For example, and as illustrated, the first inclined folding surface 416 extends from a first point 618 adjacent to the retaining surface 414 to a second point 619 adjacent to the first mounting foot 602. The first inclined folding surface 416 can extend further distances, shorter distances, or along other lengths or axes than are illustrated in FIG. 6. Additionally, the first inclined folding surface 416 can include a third chamfered notch 620. The third chamfered notch 620 can facilitate an initial fold of the second outer flap 208b of the box 110, for example during a third folding operation to fold the box 110.

Figure 7:
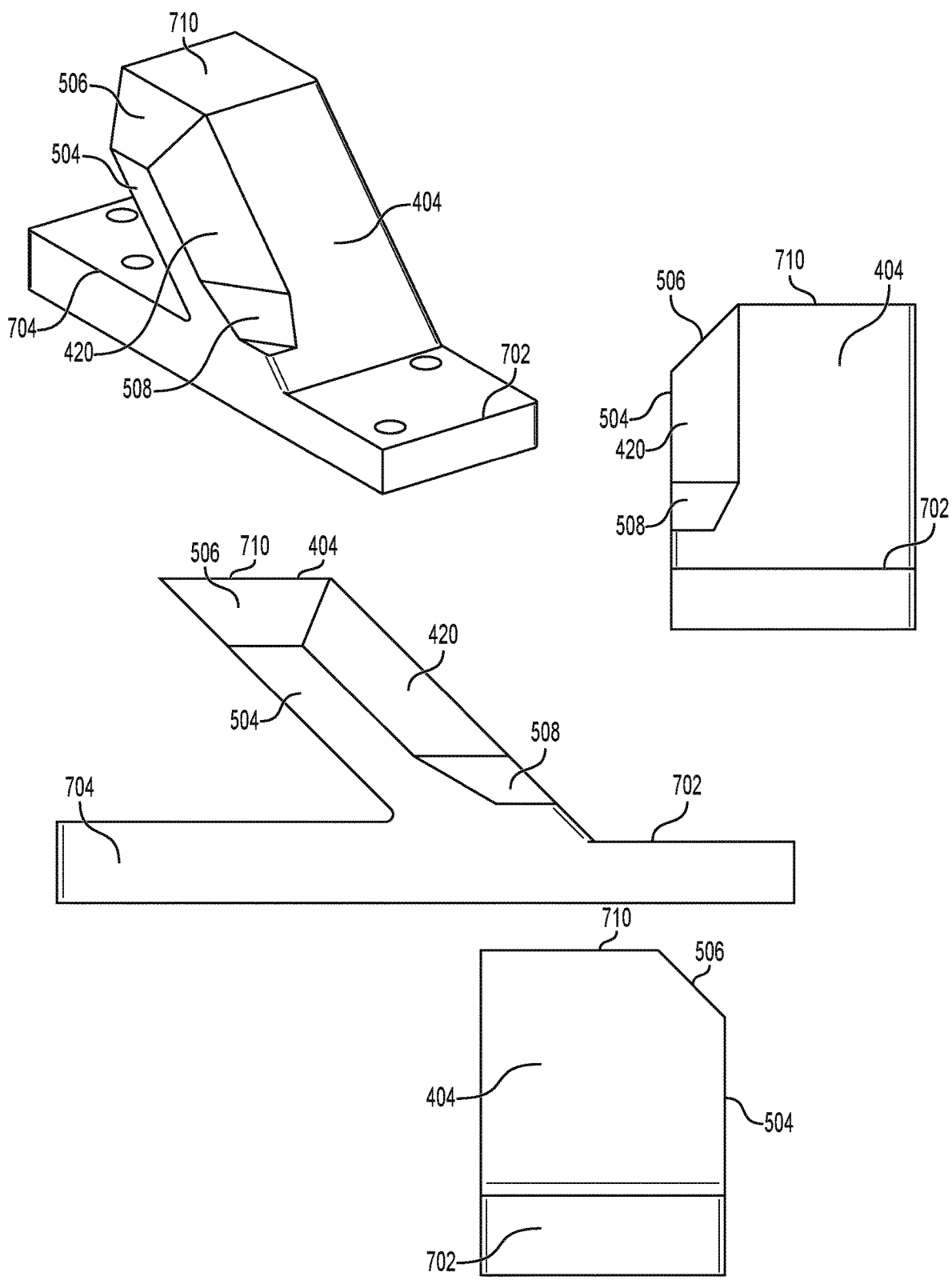
FIG. 7 is a set of views of an erect folding member of the box folding structure according to some examples of the present disclosure.

FIG. 7 is a set of views of an erect folding member 404 of the box folding structure 102 according to some examples of the present disclosure. As illustrated in FIG. 7, the erect folding member 404 includes the second inclined folding surface 420. Additionally, the erect folding member 404 can include a second mounting foot 702, a third mounting foot 704, and the first chamfered notch 506. The second mounting foot 702 can be positioned on a first side (e.g., a forward end) of the erect folding member 404. The second mounting foot 702 may correspond to the first mounting foot 602 such that the first mounting foot 602 and the second mounting foot 702 can be positioned on a similar or identical side of the box folding structure 102 for allowing the curved folding member 402 and the erect folding member 404 to be mechanically coupled. The third mounting foot 704 can be positioned on a second side (e.g., a rear end) of the erect folding member 404 and may allow the erect folding member 404 to be mechanically coupled to the support frame 302 or other suitable surfaces. Additionally or alternatively, the second side of the erect folding member 404 may be positioned the first side of the erect folding member 404.

In some examples, the first chamfered notch 506 can be positioned on the erect folding member 404 adjacent to the second inclined folding surface 420. For example, and as illustrated, the first chamfered notch 506 is defined in a first position (e.g., a top portion) with respect to the erect folding member 404, which is adjacent to the second inclined folding surface 420 that is positioned in a second position (e.g., a middle-to-bottom portion) with respect to the erect folding member 404. The first chamfered notch 506 can be configured to allow a start of the second folding operation by causing the second outer flap 208b to begin to be folded and directed to the second inclined folding surface 420 and to a flat folding surface 710. The flat folding surface 710 can be positioned adjacent to the second inclined folding surface 420, the first chamfered notch 506, or a combination thereof and can be configured to finish folding the outer flap that the first chamfered notch 506 and/or the second inclined folding surface 420 began to fold.

Figure 8:
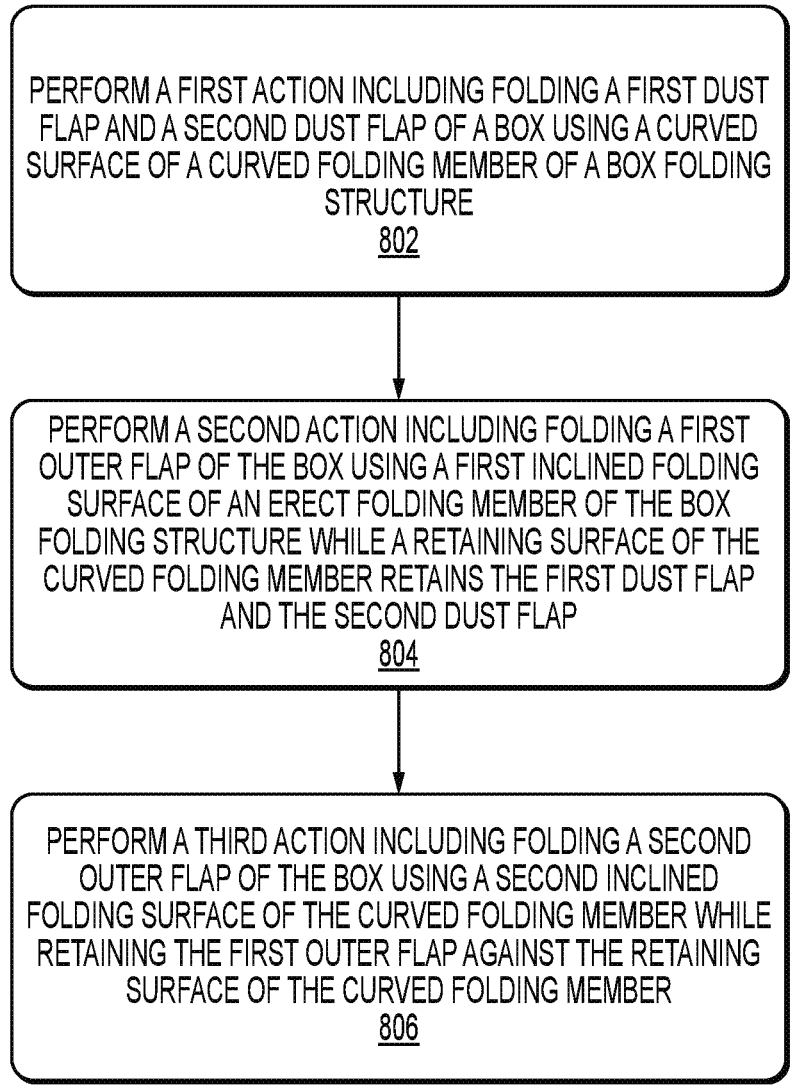
FIG. 8 is a flowchart of a process for folding a box using a box folding structure according to some examples of the present disclosure.

FIG. 8 is a flowchart of a process 800 for folding a box 110 using a box folding structure 102 according to some examples. The box 110 may be manipulated via one or more of the operations described with respect to the process 800 using a robotic manipulator 104 that can at least temporarily pick up and manipulate (e.g., via vacuum force) the box 110 using the end effector 108 including a vacuum nozzle, or any other suitable end effector combination for performing the described functions. In some embodiments, the process 800 may be or otherwise include a computer-implemented process that includes a set of instructions, which may be stored in a non-transitory computer-readable media, for controlling the robotic manipulator 104 to manipulate the box 110 with respect to the box folding structure 102 to perform the recited operations of the process 800. In some embodiments, one or more operations of the process 800 may also be performed, at least in part, by a human operator. Additionally, while the process 800 is described with respect to the box folding structure 102, other suitable box folding structures or erecting devices can additionally or alternatively be used with respect to the process 800.

The process 800 may begin at block 802 by performing a first action that includes folding a first dust flap 206a and a second dust flap 206b of the box 110. The robotic manipulator 104 may, for example using the end effector 108 or other suitable component, pick up the box 110 via the main compartment 202 of the box 110. The box 110 can be rotated, translated, or otherwise manipulated to cause the first dust flap 206a and the second dust flap 206b, along with the first outer flap 208a and the second outer flap 208b, to be in an unfolded configuration and to be proximate to the box folding structure 102. The first outer flap 208a can be positioned in the slot 406 of the box folding structure 102 to position the first dust flap 206a and the second dust flap 206b above the curved surface 412 of the curved folding member 402 of the box folding structure 102. The box 110 can be lowered to cause the first dust flap 206a and the second dust flap 206b to contact the curved surface 412, and the robotic manipulator 104 can translate the box 110 along an axis of the curved folding member 402 that is parallel to the erect folding member 404 or that otherwise follows the radius-of-curvatures of the first curve 604 and the second curve 606. In some examples, the box 110 can be translated first across the first curve 604 to fold the first dust flap 206a and then across the second curve 606 to fold the second dust flap 206b while retaining the first dust flap 206a in a folded configuration.

At block 804, the process 800 includes performing a second action that includes folding the first outer flap 208a of the box 110. In some examples, subsequent to folding the first dust flap 206a and the second dust flap 206b, the robotic manipulator 104 can translate the box 110 from the curved surface 412 to the retaining surface 414 while contacting the box folding structure 102 to retain the first dust flap 206a and the second dust flap 206b in a folded configuration. The box 110 can be rotated about a central, vertical axis to position the first outer flap 208a adjacent to the first chamfered notch 506. The box 110 can be pushed against the first chamfered notch 506 and/or then the second inclined folding surface 420 to cause the first outer flap 208a to be folded on top of the first dust flap 206a and the second dust flap 206b and into a folded configuration. The box 110 can subsequently be rotated back about the central axis to position the second outer flap 208b in the slot 406 defined by the box folding structure 102.

At block 806, the process 800 includes performing a third action that includes folding the second outer flap 208b of the box 110. The robotic manipulator 104 can translate the box 110 from the second inclined folding surface 420 to the first inclined folding surface 416 of the curved folding member 402. In doing so, the second outer flap 208b can contact the first inclined folding surface 416 to fold the second outer flap 208b on top of the first dust flap 206a and the second dust flap 206b. The second inclined folding surface 420 may retain the first outer flap 208a in the folded configuration on top of the first dust flap 206a and the second dust flap 206b while the second outer flap 208b is being folded. In some examples, the first outer flap 208a may be adjacent to, but not overlapping, the second outer flap 208b in the folded configuration.

Figure 9:
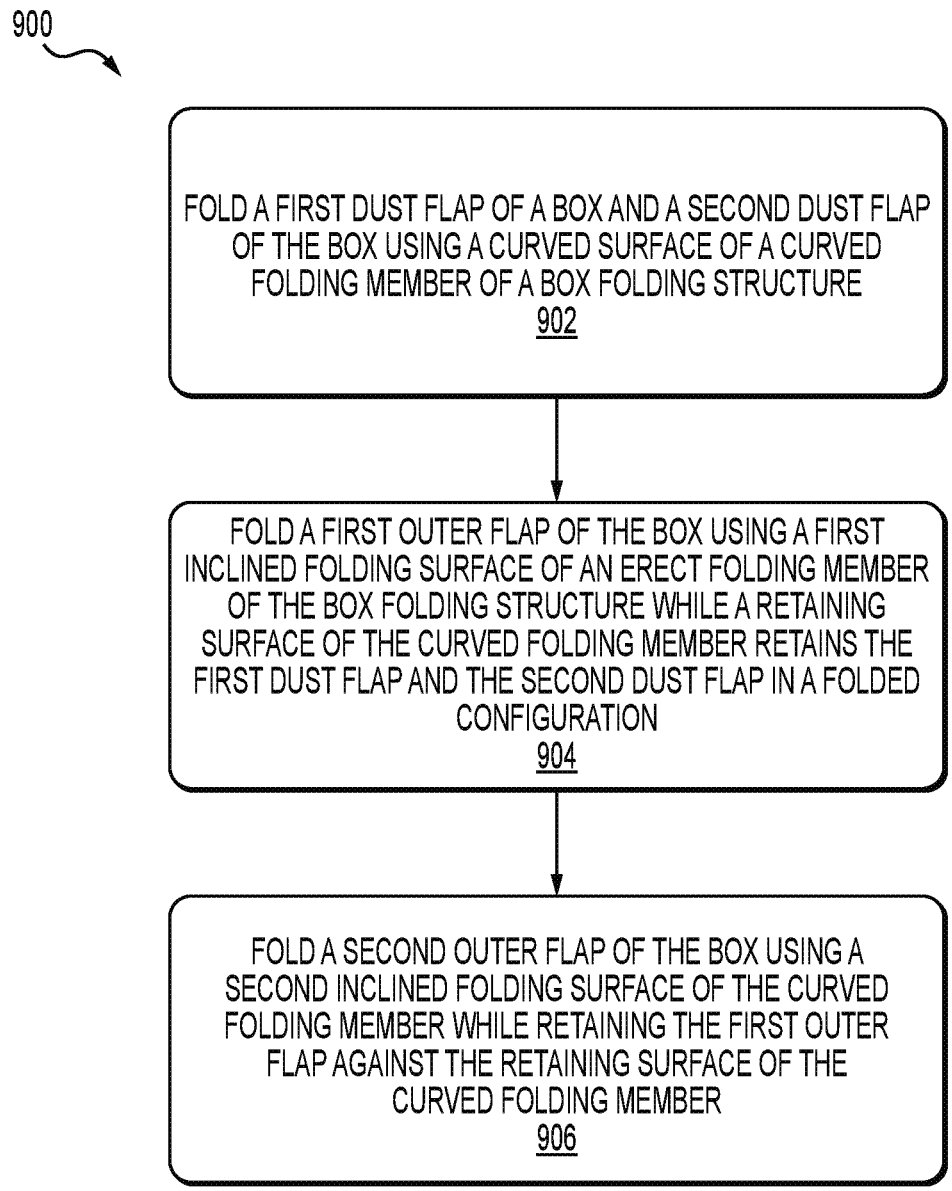
FIG. 9 is a flowchart of a process for folding a box using a box folding structure according to some examples of the present disclosure.

FIG. 9 is a flowchart of a process 900 for folding a box 110 using a box folding structure 102 according to some examples. The box 110 may be manipulated via one or more of the operations described with respect to the process 900 using a robotic manipulator 104 that can at least temporarily pick up and manipulate (e.g., via vacuum force) the box 110 using the end effector 108 including a vacuum nozzle, or any other suitable end effector combination for performing the described functions. In some embodiments, the process 900 may be or otherwise include a computer-implemented process that includes a set of instructions, which may be stored in a non-transitory computer-readable media, for controlling the robotic manipulator 104 to manipulate the box 110 with respect to the box folding structure 102 to perform the recited operations of the process 900. In some embodiments, one or more operations of the process 900 may also be performed, at least in part, by a human operator. Additionally, while the process 900 is described with respect to the box folding structure 102, other suitable box folding structures or erecting devices can additionally or alternatively be used with respect to the process 900.

The process 900 may begin at block 902 by folding a first dust flap 206a of a box 110 and a second dust flap 206b of the box 110 using a curved surface 412 of a curved folding member 402 of a box folding structure 102. The robotic manipulator 104 may cause the box 110 to contact the box folding structure 102. For example, the robotic manipulator 104 can move the box 110 such that the first dust flap 206a contacts the first curve 604 and the flat surface 625 of the curved surface 412 to fold the first dust flap 206a. Additionally, the robotic manipulator 104 can, simultaneously or subsequently to folding the first dust flap 206a, move the box 110 such that the second dust flap 206b contacts the second curve 606 of the curved surface 412 to fold the second dust flap 206b.

At block 904, the robotic manipulator 104 folds a first outer flap 208a of the box 110 using a first inclined folding surface 416 of an erect folding member 404 of the box folding structure 102 while a retaining surface 414 of the curved folding member 402 retains the first dust flap 206a and the second dust flap 206b in a folded configuration. Subsequent to folding the first dust flap 206a and the second dust flap 206b, the robotic manipulator 104 can rotate the box 110 about a vertical, central axis to translate the first outer flap 208a into the slot 406 defined by the curved folding member 402 being laterally offset from the erect folding member 404. The robotic manipulator 104 can press the first outer flap 208a against the first chamfered notch 506 of the erect folding member 404 to cause the first outer flap 208a to begin folding, and the robotic manipulator 104 can continue translating the box 110 to above the flat folding surface 710 to cause the first outer flap 208a to transform into a folded configuration by contacting the first inclined folding surface 416 and/or the flat folding surface 710.

At block 906, the robotic manipulator 104 folds a second outer flap 208b of the box 110 using a second inclined folding surface 420 of the curved folding member 402 while retaining the first outer flap 208a against the retaining surface 414 of the curved folding member 402. Subsequent to folding the first outer flap 208a, the robotic manipulator 104 can translate the box 110 toward the curved folding member 402. While the retaining surface 414 and/or the flat folding surface 710 retains the first dust flap 206a, the second dust flap 206b, and/or the first outer flap 208a in a folded configuration, the robotic manipulator 104 can translate the box to cause the second outer flap 208b to contact the second inclined folding surface 420. The robotic manipulator 104 can continue pressing the second outer flap 208b against the second inclined folding surface 420 to cause the second outer flap 208b to be transformed into a folded configuration.

Figure 10:
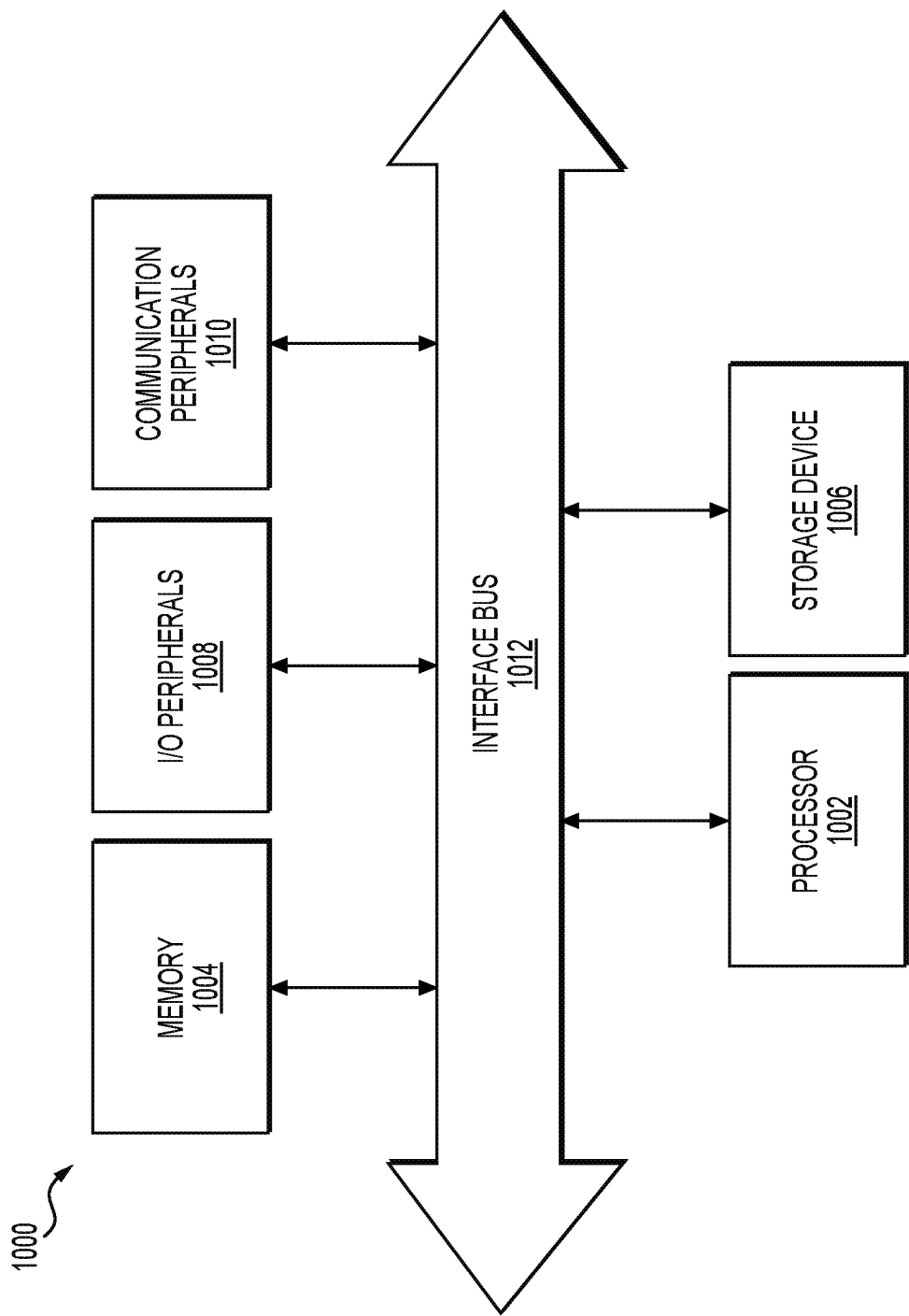
FIG. 10 is a block diagram of an example of a computer system that can be used to control a robotic manipulator to fold a box with a box folding structure according to some examples of the present disclosure.

FIG. 10 illustrates examples of components of a computer system 1000, according to at least one example. The computer system 1000 may be a single computer such as a user computing device and/or can represent a distributed computing system such as one or more server computing devices. In some embodiments, the computer system 1000 is an example of the computer system 106. In some examples, the computer system 1000 may be configured to control the operation of one or more automated elements, such as robotic manipulators, conveyor belts, robotic palletizers, and any other automated equipment, of a warehouse, manufacturing facility, bottling facility, packing facility, or the like.

The computer system 1000 may include at least a processor 1002, a memory 1004, a storage device 1006, input/output peripherals 1008, communication peripherals 1010, and an interface bus 1012. The interface bus 1012 is configured to communicate, transmit, and transfer data, controls, and commands among the various components of the computer system 1000. The memory 1004 and the storage device 1006 include computer-readable storage media, such as Radom Access Memory (RAM), Read ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. The memory 1004 and the storage device 1006 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer system 1000.

Further, the memory 1004 includes an operating system, programs, applications, and/or other software, models, modules, and the like. The processor 1002 is configured to execute the stored instructions and includes, for example, a logical processing unit, a microprocessor, a digital signal processor, and other processors. The memory 1004 and/or the processor 1002 can be virtualized and can be hosted within another computing system of, for example, a cloud network or a data center. The input/output peripherals 1008 include user interfaces, such as a keyboard, screen (e.g., a touch screen), microphone, speaker, other input/output devices, and computing components, such as graphical processing units, serial ports, parallel ports, universal serial buses, and other input/output peripherals. The input/output peripherals 1008 are connected to the processor 1002 through any of the ports coupled to the interface bus 1012. The communication peripherals 1010 are configured to facilitate communication between the computer system 1000 and other computing devices over a communications network and include, for example, a network interface controller, modem, wireless and wired interface cards, antenna, and other communication peripherals.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and all three of A and B and C.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A box folding structure for use with a robotic manipulator, the box folding structure comprising:
    a curved folding member comprising:
        a curved surface defined on a first portion of the curved folding member, the curved surface configured for folding a first dust flap of a box and a second dust flap of the box during a first folding operation;
        a retaining surface defined on a second portion of the curved folding member and adjacent to the curved surface, the retaining surface configured for retaining the first dust flap and the second dust flap in a folded configuration during movement of the box between the first folding operation and a second folding operation;
        a first inclined folding surface defined on a third portion of the curved folding member that is adjacent to the curved surface, the first inclined folding surface extending from the retaining surface and configured for folding a first outer flap of the box during a third folding operation; and
    an erect folding member that is laterally offset from the curved folding member, the erect folding member comprising a second inclined folding surface defined on a fourth portion of the erect folding member opposite the first inclined folding surface, the second inclined folding surface configured for folding a second outer flap of the box during the second folding operation, the first inclined folding surface and the second inclined folding surface laterally spaced apart and defining a slot to receive the second outer flap during the first folding operation and the second folding operation; and a set of mounting feet for mounting the box folding structure to a surface to restrict motion of the box folding surface, wherein the box is foldable by moving the box with respect to the box folding structure that is configured to remain stationary.

2. The box folding structure of claim 1, wherein the erect folding member and the curved folding member are mechanically coupled to a support frame via a plurality of mounting feet, and wherein:
    the erect folding member is mechanically coupled to the curved folding member via the plurality of mounting feet; or
    the erect folding member is mechanically coupled to the support frame via a first mounting foot of the plurality of mounting feet and separately from and adjacent to the curved folding member that is mounted to the support frame via a second mounting foot of the plurality of mounting feet.

3. The box folding structure of claim 1, wherein the first inclined folding surface is adjacent to a first rigid surface, the second inclined folding surface is adjacent to a second rigid surface, and wherein the first rigid surface and the second rigid surface are coplanar with respect to one another.

4. The box folding structure of claim 1, wherein the retaining surface includes a chamfered edge that is configured to facilitate rotation of the box during the second folding operation.

5. The box folding structure of claim 1, wherein the curved surface comprises a first curve, a second curve adjacent to the first curve, and a third curve adjacent to the second curve, wherein the first curve includes a first radius-of-curvature that is configured to facilitate folding the first dust flap during a first portion of the first folding operation, wherein the second curve includes a second radius-of-curvature that is configured to facilitate folding the second dust flap during a second portion of the first folding operation, and wherein the third curve includes a third radius-ofcurvature that is configured to retain the first dust flap and the second dust flap in a folded configuration.

6. The box folding structure of claim 5, wherein the first radius-of-curvature, the second radius-of-curvature, and the third radius-of-curvature are values that vary across an arc of the first curve, the second curve, and the third curve, respectively, and wherein the third curve curves in an opposite direction compared to the first curve and the second curve.

7. The box folding structure of claim 6, wherein at a first end of the first curve, the first radius-of-curvature is zero, wherein at a second end of the first curve opposite the first end, the first radius-of-curvature has a maximum value, wherein at a first end of the second curve, the second radius-of-curvature has the maximum value, wherein the first end of the second curve is the same as the second end of the first curve, and wherein at a second end of the second curve opposite the first end, the second radius-of-curvature is zero and the second curve is connected to the retaining surface via the third curve.

8. The box folding structure of claim 7, wherein a top end of a flat surface adjacent to the first curve extends vertically above the second end of the second curve.

9. The box folding structure of claim 1, wherein the erect folding member further comprises a chamfered notch adjacent to the second inclined folding surface, wherein the chamfered notch is configured to begin folding the second dust flap during the second folding operation.

10. The box folding structure of claim 1, wherein a first mounting foot of the set of mounting feet is coupled with and extends from the curved folding member, wherein a second mounting foot of the set of mounting feet extends from the erect folding member, and wherein the first mounting foot is coupled with the second mounting foot to allow the box folding structure to remain stationary while the box is moved with respect to the box folding structure to fold the box.

11. The box folding structure of claim 1, wherein the first portion of the curved folding member and the second portion of the curved folding member connect at a first geometric plane, wherein the third portion of the curved folding member is on a second geometric plane that is offset from the first geometric plane.

12. The box folding structure of claim 1, wherein the first inclined folding surface is approximately parallel with respect to the second inclined folding surface for forming the slot.

* * * * *